(12) United States Patent
Liao

(10) Patent No.: US 6,734,596 B1
(45) Date of Patent: May 11, 2004

(54) ASSEMBLING TYPE ROTOR STRUCTURE OF BRUSHLESS MOTOR

(75) Inventor: Gordon Liao, Yung Kang (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 0 days.

(21) Appl. No.: 10/388,583

(22) Filed: Mar. 17, 2003

(30) Foreign Application Priority Data

Jan. 6, 2003 (TW) ........................................ 92100214 A

(51) Int. Cl.⁷ ................................................ H02K 1/22
(52) U.S. Cl. ........................................ 310/261; 310/216
(58) Field of Search ...................... 310/261, 214–218, 310/262, 265, 156.01, 165.56, 156.61

(56) References Cited

U.S. PATENT DOCUMENTS

| | | | | |
|---|---|---|---|---|
| 3,777,196 A | * | 12/1973 | Field, II | 310/156.64 |
| 3,914,859 A | * | 10/1975 | Pierson | 29/596 |
| 4,179,634 A | * | 12/1979 | Burson | 310/153 |
| 4,588,914 A | * | 5/1986 | Heyne | 310/156.11 |
| 4,777,397 A | * | 10/1988 | Parshall | 310/156.15 |
| 5,063,318 A | * | 11/1991 | Anderson | 310/156.19 |
| 5,760,520 A | * | 6/1998 | Hasebe et al. | 310/261 |
| 6,002,186 A | * | 12/1999 | Coutu et al. | 310/49 R |
| 6,603,232 B2 | * | 8/2003 | Van Dine et al. | 310/156.01 |
| 6,630,764 B1 | * | 10/2003 | Dube et al. | 310/177 |

* cited by examiner

Primary Examiner—Thanh Lam
(74) Attorney, Agent, or Firm—Troxell Law Office PLLC

(57) ABSTRACT

An assembling type rotor structure of brushless motor can be applied both in outer stator/inner rotor motor and inner stator/outer rotor motor. The rotor structure includes a rotor's main body having a plurality of ribs made of non-permeable material and a plurality of embedded small teeth capable to be disassembled in axial direction. These small teeth are formed by punching and stacking up a plurality of permeable silicon steel sheets, and each of these small teeth has a scoop channel having configuration and size matching those of the ribs of the rotor's main body. In this way, these small teeth of the rotor can be tightly embedded and fitted into the rotor's main body in axial direction but can not be moved in tangential nor in radial directions. Therefore, the rotor structure provides a rather firm fixation. What is more, the containing holes formed between each pair of the adjacent small teeth of embedded type can let the permanent magnets be embedded and fixed therein. A rotor structure of brushless motor can then be assembled by locking up with a front and a rear sealing caps at the front and rear ends of the rotor's main body to hold the permanent magnets and the small teeth of embedded type in place.

5 Claims, 14 Drawing Sheets

SECTION F-F

ASSEMBLING TYPE ROTOR STRUCTURE OF BRUSHLESS MOTOR

FIELD OF THE INVENTION

The invention relates to an assembling type rotor structure of brushless direct-current (DC) motor, and more particularly, to a rotor structure that provides embedded type of assembling, low manufacturing cost, and very firm fixation after being assembled.

BACKGROUND OF THE INVENTION

The rotor of brushless DC motors in the prior art is usually formed with a permanent magnet 10 and silicon steel sheets 11 as in the referenced R.O.C. Patent 327485 and 412100 shown in FIG. 1 and FIG. 2 respectively. The permanent magnet is covered on the rims of the silicon steel sheets and has to match the curvature of the circular arc of the outer stator of the inner rotor/outer stator brushless DC motor. Similarly, it has to match the shape of the vertex of the inner stator of outer rotor/inner stator brushless DC motor to be tightly fitted.

In general, the silicon steel sheets of the rotor of brushless DC motor in prior art are formed by stacking up a plurality of individual silicon steel sheet of the same size and configuration. There is no problem for manufacturing such silicon steel sheet when the rotor is applied in a small-diameter brushless DC motor. Nevertheless, the cost of manufacturing large-diameter brushless DC motor with stacked silicon steel sheets increases greatly due to the requirement of a heavy duty punching machine with high impact force. Besides, when it comes to punching silicon steel sheets, it is a waste of material for having a lot of remaining material. On the other hand, there exists some techniques to fit and attach the permanent magnet and the silicon steel sheets together, but none of the techniques in prior art provides solutions for the loosening problem of the permanent magnet and for the difficulty in controlling precise dimension. Although improvements have been made for these disadvantages in the R.O.C. Patent 327485 and 412100, as shown in FIG. 1 and FIG. 2 respectively, the manufacturing cost is rather high. This is because that the production of the permanent magnet has the requirement of matching the curvature of the circular arc of the outer stator's internal surface and the fixed scoop channels on the two sides. What is more, the techniques of the prior art are applicable only in inner rotor/outer stator brushless DC motor, but not easily applicable in outer rotor/inner stator brushless DC motor, therefore, the scope of application is limited.

FIG. 3 and FIG. 4 are the prior arts of U.S. Pat. Nos. 5,929,120 and 5,886,441 respectively. As shown in FIG. 3 and FIG. 4, the silicon steel sheets 12 are formed with disassembled steel sheet units, and having containing slots 13 in the silicon steel sheets for housing the permanent magnets which are in rectangular shape instead of the round shape. The fixation technique to hold the silicon steel sheets and the axis of the rotor structure in place is to employ fixation pins and the rotor's front and rear caps. The disadvantage of this kind of fixation technique is that the pins are subject to be bent and distorted when the silicon steel sheets so stacked are relatively lengthy.

SUMMARY OF THE INVENTION

In light of the above-mentioned disadvantages of the prior art, the invention provides an assembling type rotor structure of brushless DC motor. The rotor structure includes a rotor's main body having a plurality of ribs and a plurality of embedded small teeth that can be disassembled in axial direction. Each of these small teeth has a scoop channel having configuration and size matching those of the ribs of the rotor's main body. In this way, the small teeth can be embedded and fitted into the rotor's main body in axial direction while providing a rather firm fixation. Moreover, the containing slot formed between each pair of the adjacent embedded type small teeth allows the permanent magnet be embedded and fixed therein.

Therefore, one of the objects of the invention is to provide a type of rotor structure of brushless DC motor with embedded design of permanent magnets.

Another object of the invention is to provide a rotor structure that is applicable in both the outer stator/inner rotor and the inner stator/outer rotor brushless DC motor.

Further object of the invention is to provide a rotor structure such that when the assembling type rotor structure is applied in smaller outer diameter motor, the small teeth of axially embedded type can be combined to form an annular silicon steel sheet.

To accomplish the above-mentioned objects, the invention provides an assembling type rotor structure of brushless DC motor. The rotor structure includes a main body having a plurality of ribs made of non-permeable material and a plurality of embedded type small teeth formed by punching and stacking up a plurality of permeable silicon steel sheets. Each of the embedded type small teeth has a scoop channel having configuration and size matching those of the ribs of the rotor's main body to enable embedding and tightly fitting the small teeth to the rotor's main body in axial direction. In this way, each small tooth cannot be moved in tangential nor in radial direction on the plane perpendicular to the axis, thereby, providing a rather firm fixation. Moreover, the containing slot formed between each pair of the adjacent embedded type small teeth allows the permanent magnet to be embedded and fixed therein. A rotor structure of brushless DC motor can then be formed by locking up with a front and a rear sealing caps at the front and rear ends of the rotor's main body to hold the permanent magnets and the embedded type small teeth in place.

In order to understand fully the objects, characteristics, and the efficacy of the invention, a detailed illustration with accompanied drawing is described as follows:

DETAILED DESCRIPTION OF THE EMBODIMENTS

The assembling type rotor structure of the invention of brushless DC motor is both applicable in the outer stator/inner rotor and the inner stator/outer rotor motors. (Application of inner rotor/outer stator motor)

Figure 1:
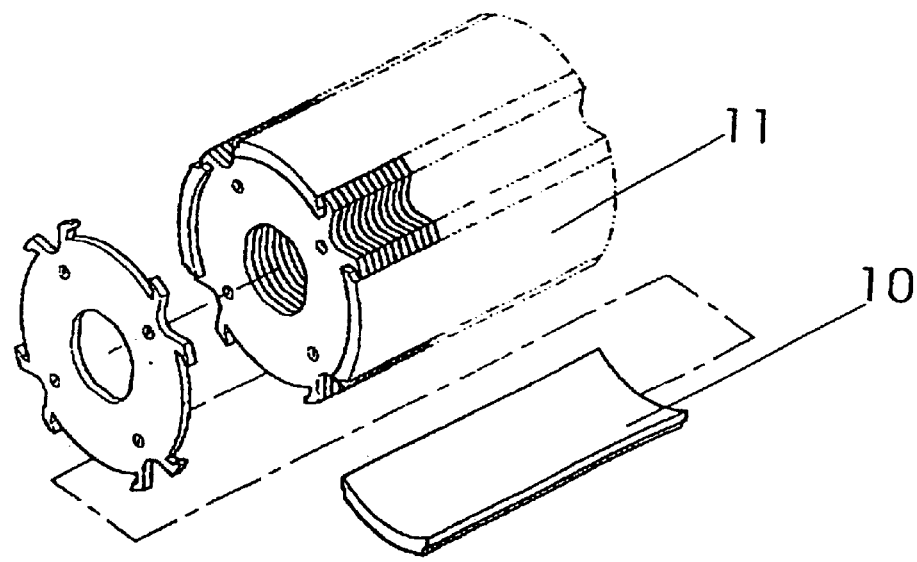
FIG. 1 is a diagram of the stator structure of outer stator/inner rotor brushless motor of the referenced R.O.C. Patent 327485 of the prior art.
Figure 2:
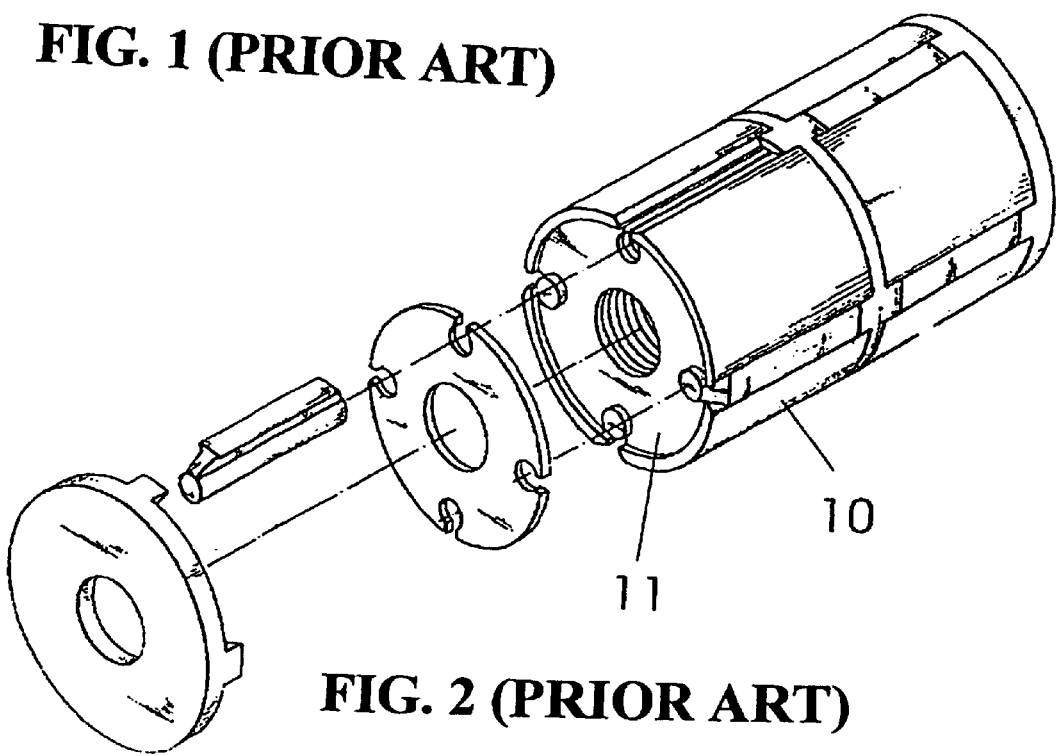
FIG. 2 is a diagram of the stator structure of outer stator/inner rotor brushless DC motor of the referenced R.O.C. Patent 412100 of the prior art.
Figure 3:
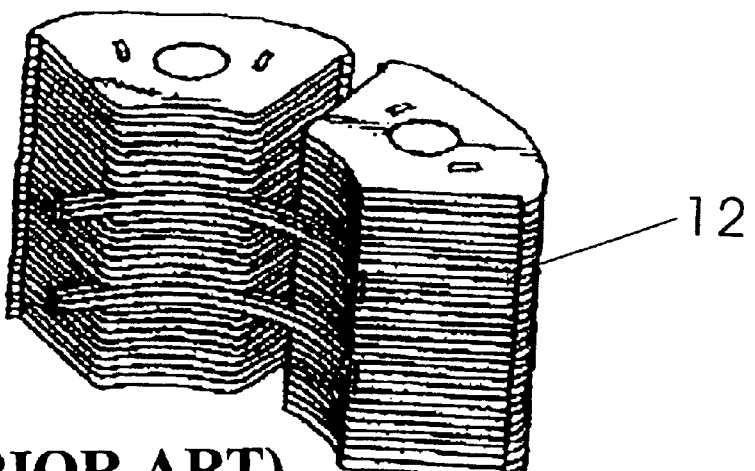
FIG. 3 is a diagram of the stator structure of outer stator/inner rotor brushless motor of the referenced U.S. Pat. No. 5,929,120 of the prior art.
Figure 4:
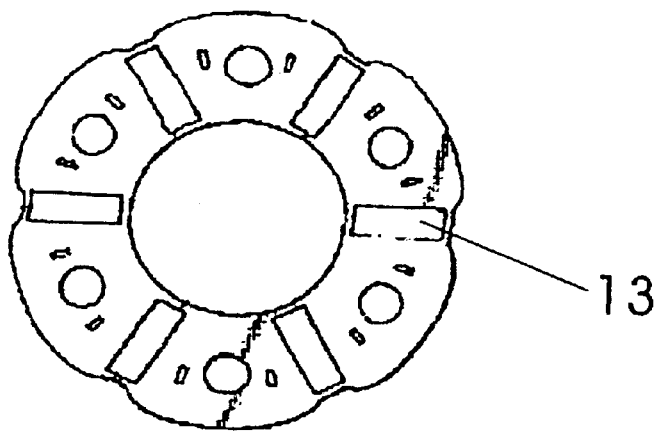
FIG. 4 is a diagram of the stator structure of outer stator/inner rotor brushless motor of the referenced U.S. Pat. No. 5,886,441 of the prior art.
Figure 4:
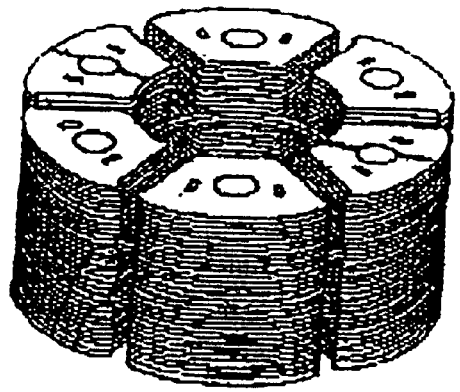
Figure 5:
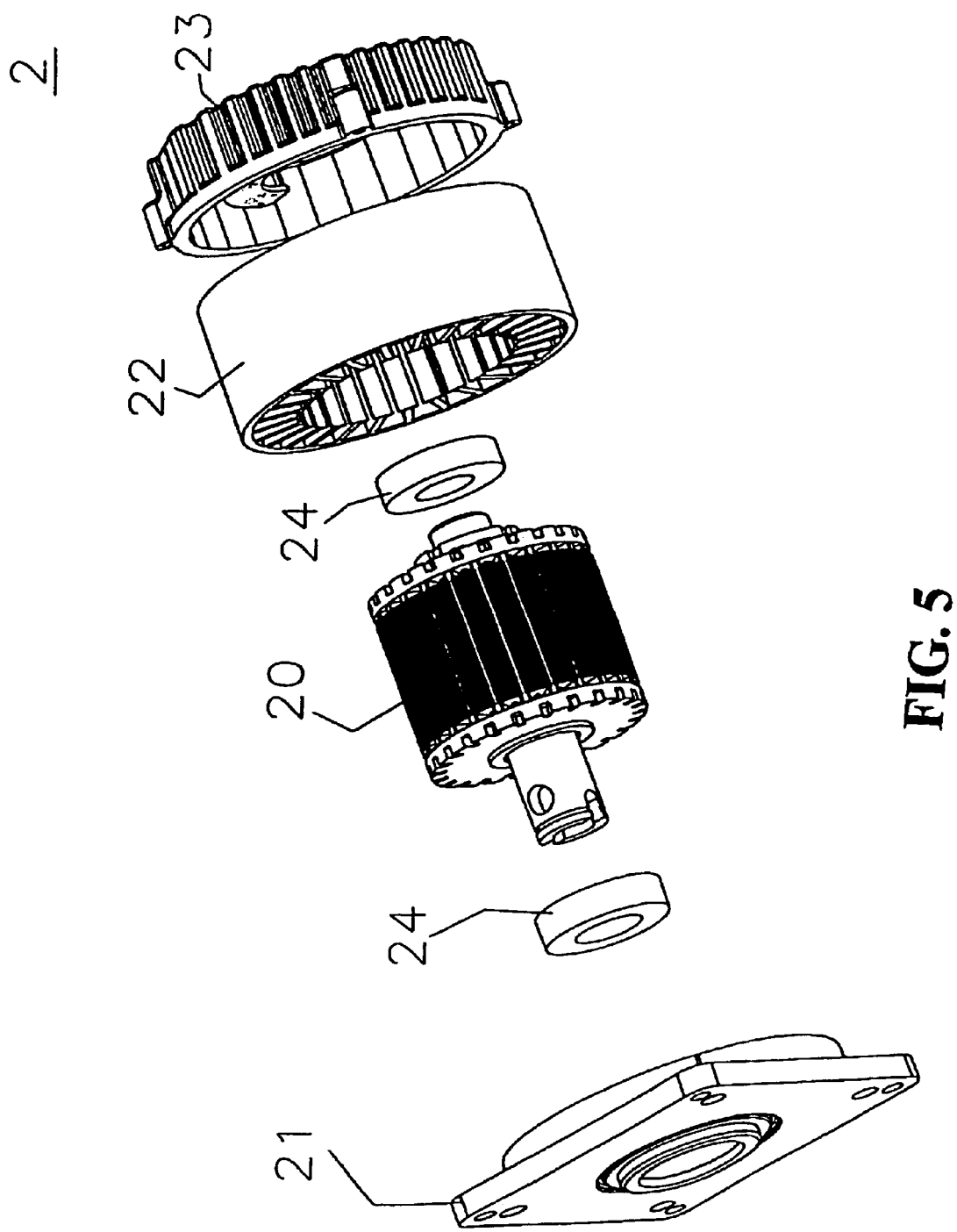
FIG. 5 is an exploded view of the inner rotor/outer stator brushless DC motor structure of the invention.
Figure 6A:
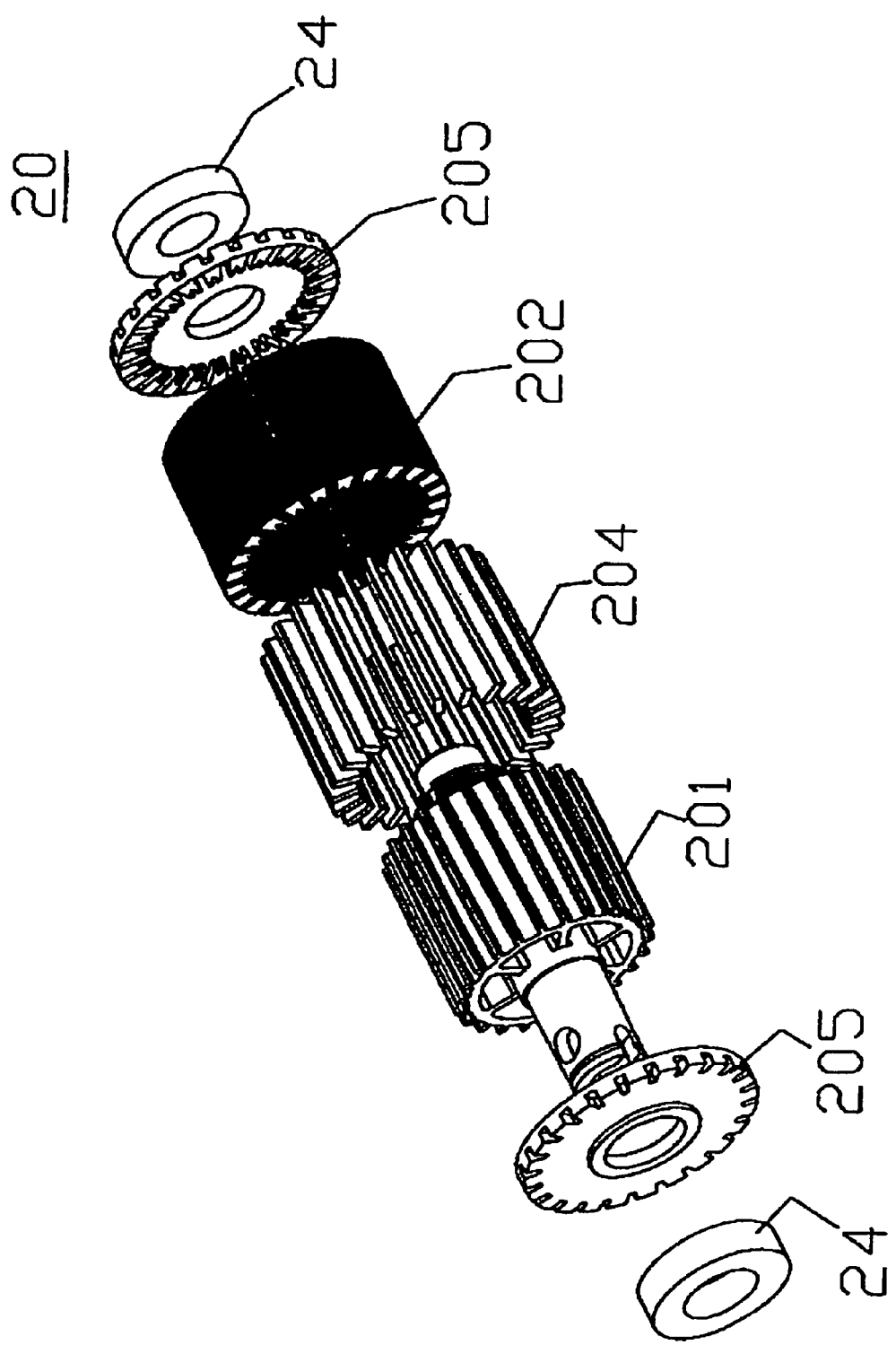
FIG. 6a is an exploded view of the rotor structure of inner rotor/outer stator brushless DC motor of the invention.
Figure 6B:
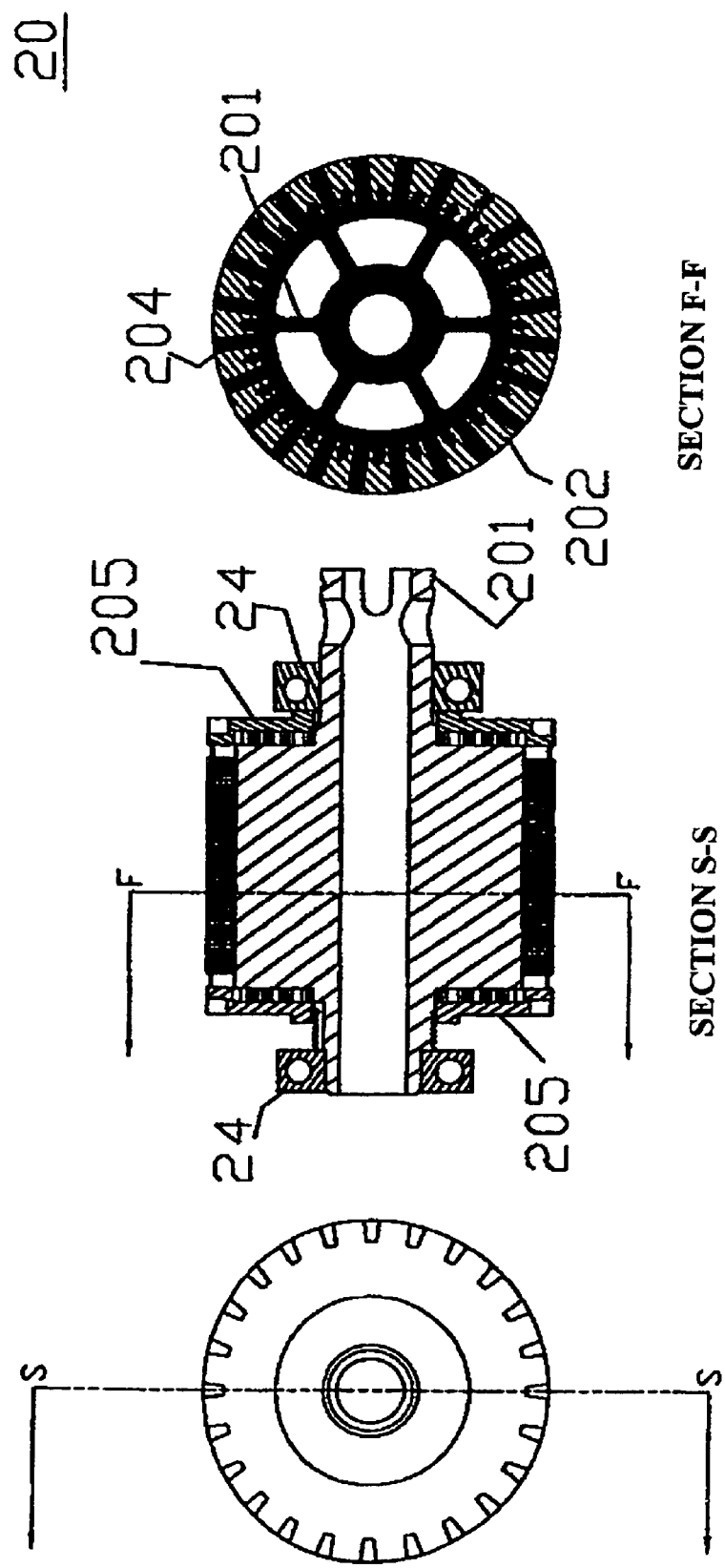
FIG. 6b is a cross-sectional view of the inner rotor/outer stator brushless DC motor structure of the invention.
Figure 6C:
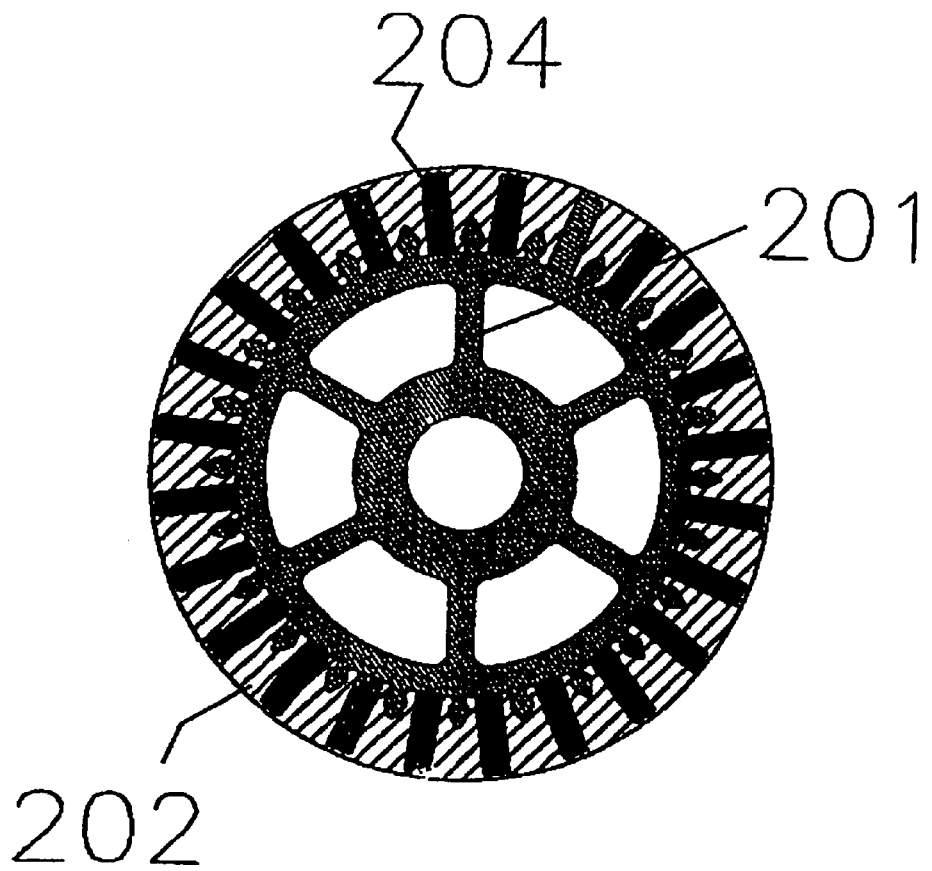
FIG. 6c is an enlarged cross-sectional view of the cutting plane F—F of the inner rotor/outer stator brushless DC motor in FIG. 6b of the invention.
Figure 7:
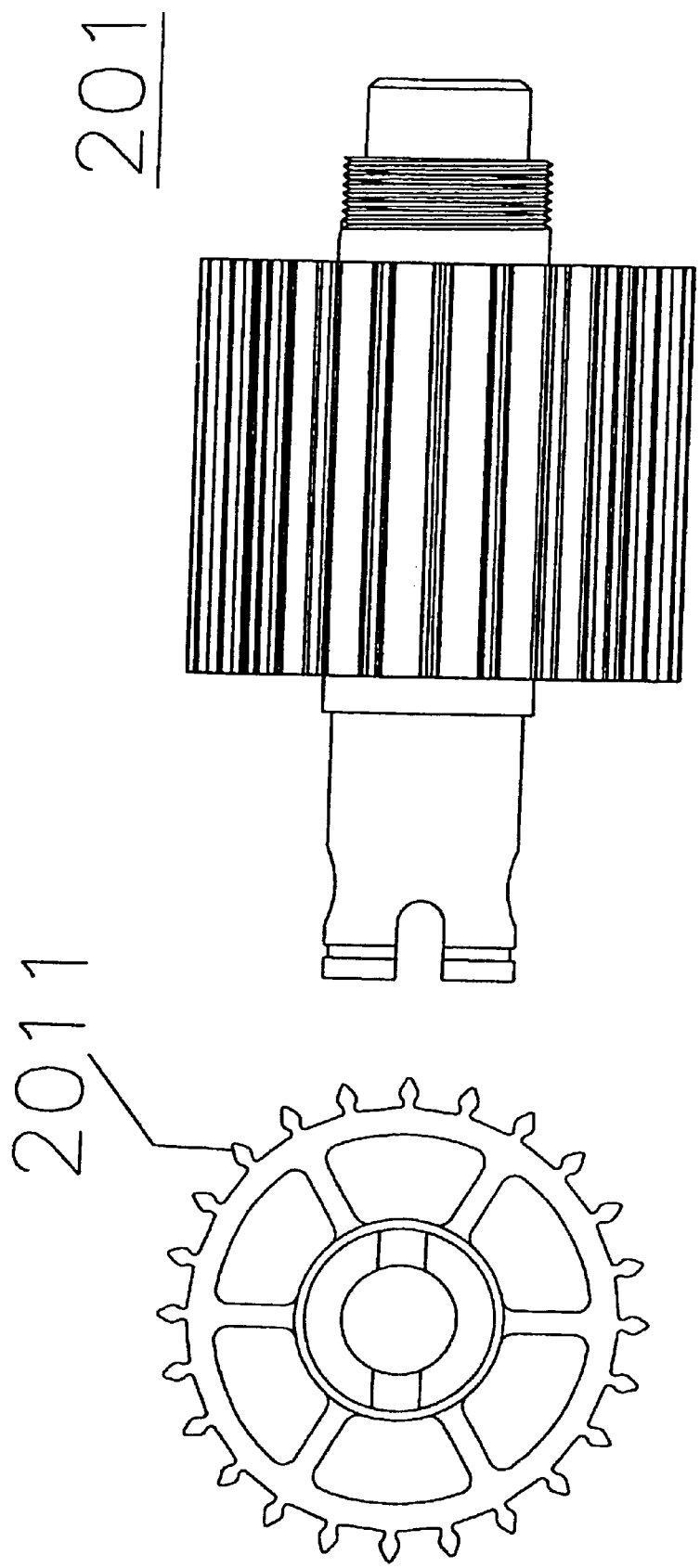
FIG. 7 is a cross-sectional view and front view of the rotor main body of inner rotor/outer stator brushless DC motor of the invention.
Figure 8:
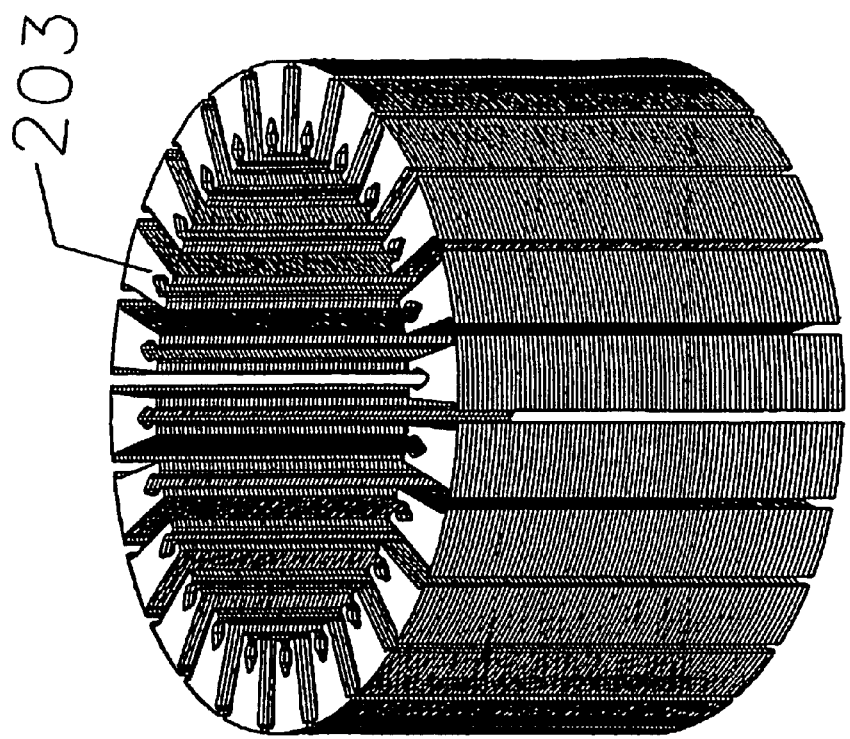
FIG. 8 is a cross-sectional view and 3-dimensional view of the embedded teeth of the inner rotor/outer stator brushless DC motor of the invention.
Figure 8:
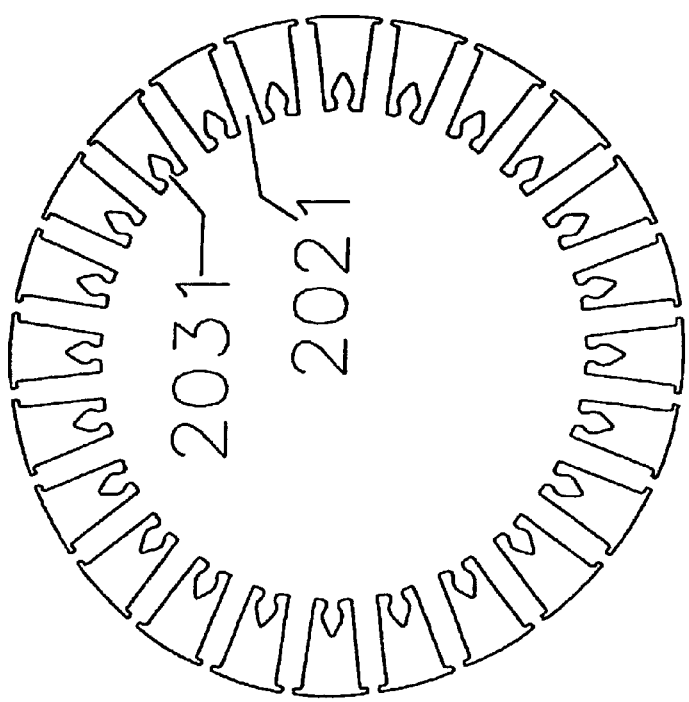

As shown in FIG. 5, the assembling type rotor structure of the invention of inner rotor/outer stator brushless DC motor includes a motor upper cover 21, a rotor structure 20, a stator 22, a lower cover 23, and a bearing 24. The rotor structure includes a plurality of the rotor's sealing caps 205, a rotor's main body 201, and a plurality of rectangular permanent magnets 204 and embedded type small teeth 202 formed with a plurality of silicon steel sheets 203 (refer to FIG. 8). As shown in FIG. 7, the rotor's main body 201 includes a plurality of ribs 2011 made of non-permeable material such as aluminum alloy, plastic, and stainless steel. As shown in FIG. 8, the embedded type small teeth 202 that can be disassembled in axial direction are formed by punching and stacking up a plurality of permeable silicon steel sheets. Each of the small teeth has a scoop channel 2031 having configuration and size matching those of the ribs 2011 (refer to FIG. 7) of the rotor's main body. In this way, the small teeth can be embedded and tightly fitted in the rotor's main body in axial direction, but can not be moved in tangential nor in radial direction in the plane perpendicular to the axis of the rotor's main body. Comparing with the prior art of the U.S. Pat. Nos. 5,929,120 and 5,886,441 in which the fixation of silicon steel sheets and the rotor's axis are implemented by positioning pins and the front-and-rear caps at both ends, the invention provides relatively firm fixation.

As shown in FIG. 6a, FIG. 6b, FIG. 6c, FIG. 7, and FIG. 8, each pair of the adjacent embedded type small teeth 202 forms containing slots 2021 (refer to FIG. 8). The containing slots 2021 are for the permanent magnets 204 (refer to FIG. 6b and 6c) to be embedded and firmly fixed therein. Because of the embedded design, the permanent magnet 204 does not have to match the dimension of the rotor's external surface as the conventional brushless DC motor does, therefore, it can greatly improve its design flexibility. Moreover, it can facilitate the assembling process and provide rather firm fixation. Besides, it can eliminates the disadvantage of requiring additional jig and fixture for positioning in order to attach the permanent magnet to the rotor as in conventional manufacturing process of brushless DC motor. In addition, when using permanent magnet made of rare earth metals manufactured by sintering, the invention allows the permanent magnet to be made in rectangular sheet structure, therefore, it can greatly reduce the manufacturing cost. The embedded type small teeth of the rotor structure are formed by punching and stacking up a plurality of permeable silicon steel sheets. Because the rotor can be disassembled into a plurality of unit tooth, and then be embedded and fitted in the rotor's main body, the cost of the total manufacturing process is much less than that of conventional manufacturing process. It can save a lot in mold making and material used.

Please refer to FIG. 6a again for the assembling procedure of the rotor structure applied in inner rotor/outer stator brushless DC motor. The stacked embedded type small teeth 202 are first tightly fitted into the rotor's main body 201 in axial direction. Then, the permanent magnet 204 is embedded and fitted in the containing slot 2021 (refer to FIG. 8) formed between each pair of adjacent embedded type small teeth. Afterward, the two sealing caps 205 at both the front and the rear ends are employed to fix the rotor structure in position. Finally, the inner rotor/outer stator brushless DC motor is formed with the other components such as the stator 22, bearing 24, front cap 21, and rear cap 23 as shown in FIG. 5. (Application of the invention in inner stator/outer rotor motor)

Figure 9:
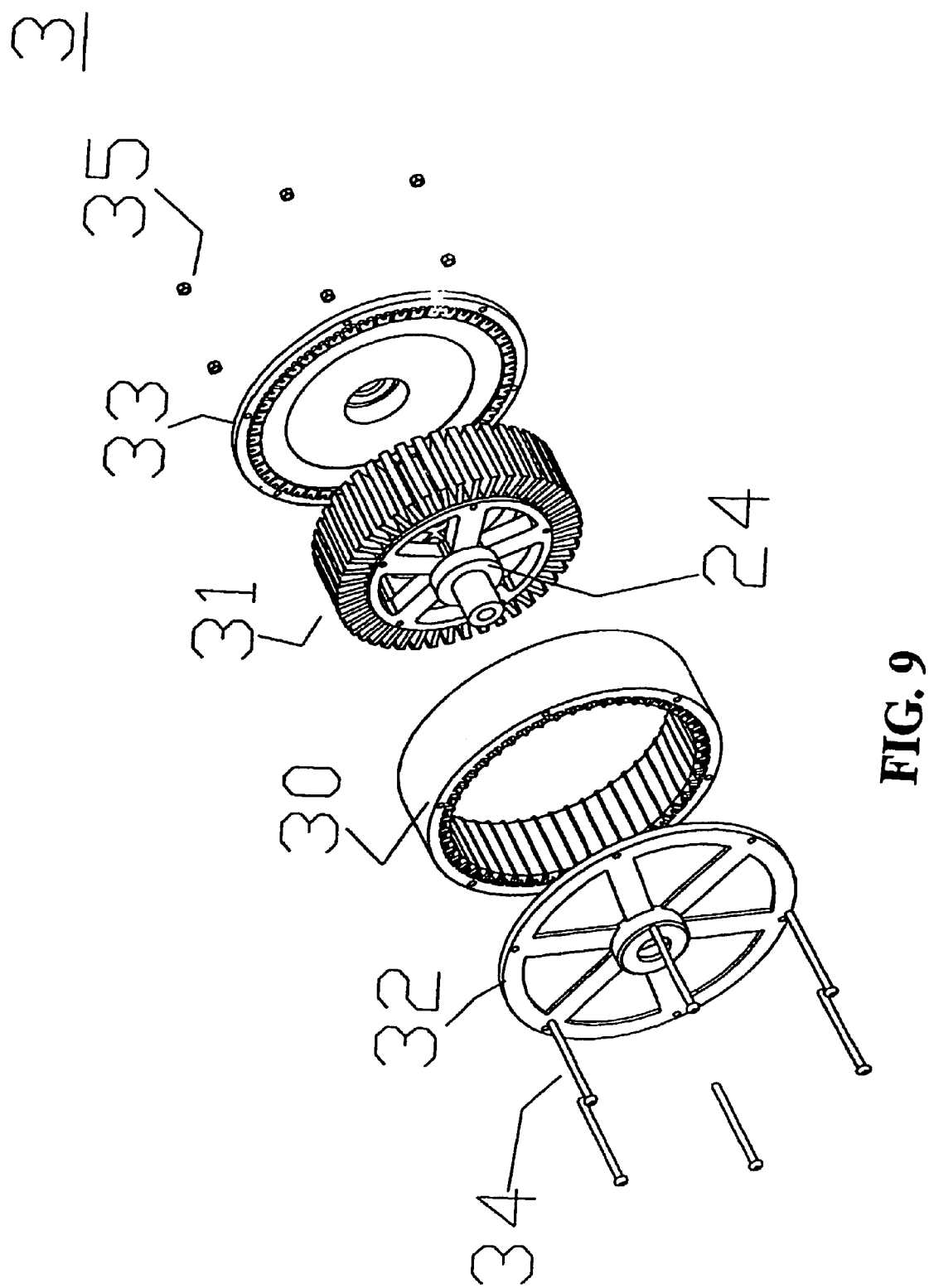
FIG. 9 is an exploded view of the outer rotor/inner stator brushless DC motor structure of the invention.
Figure 10A:
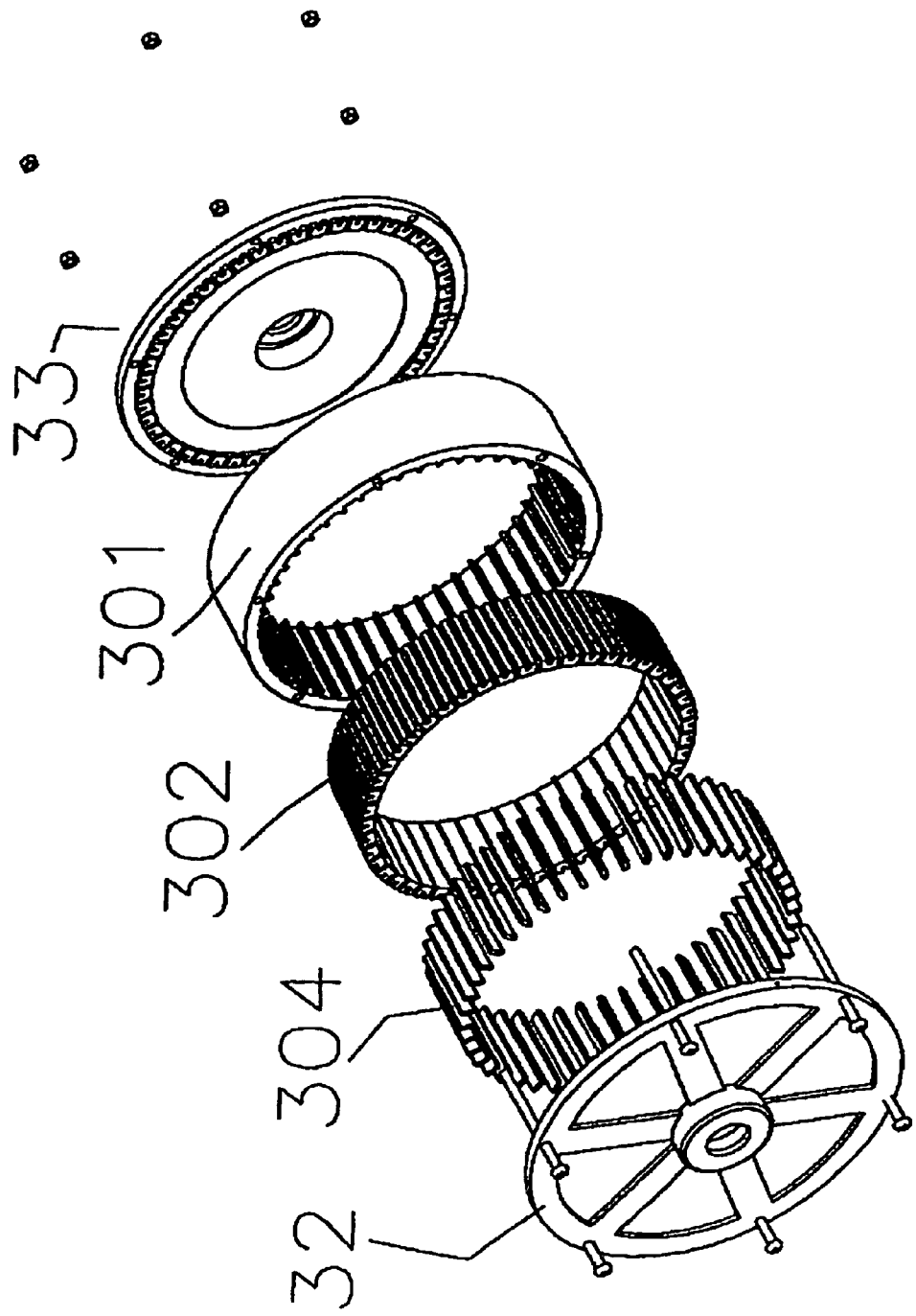
FIG. 10a is an exploded view of the outer rotor/inner stator brushless DC motor structure of the invention.
Figure 10B:
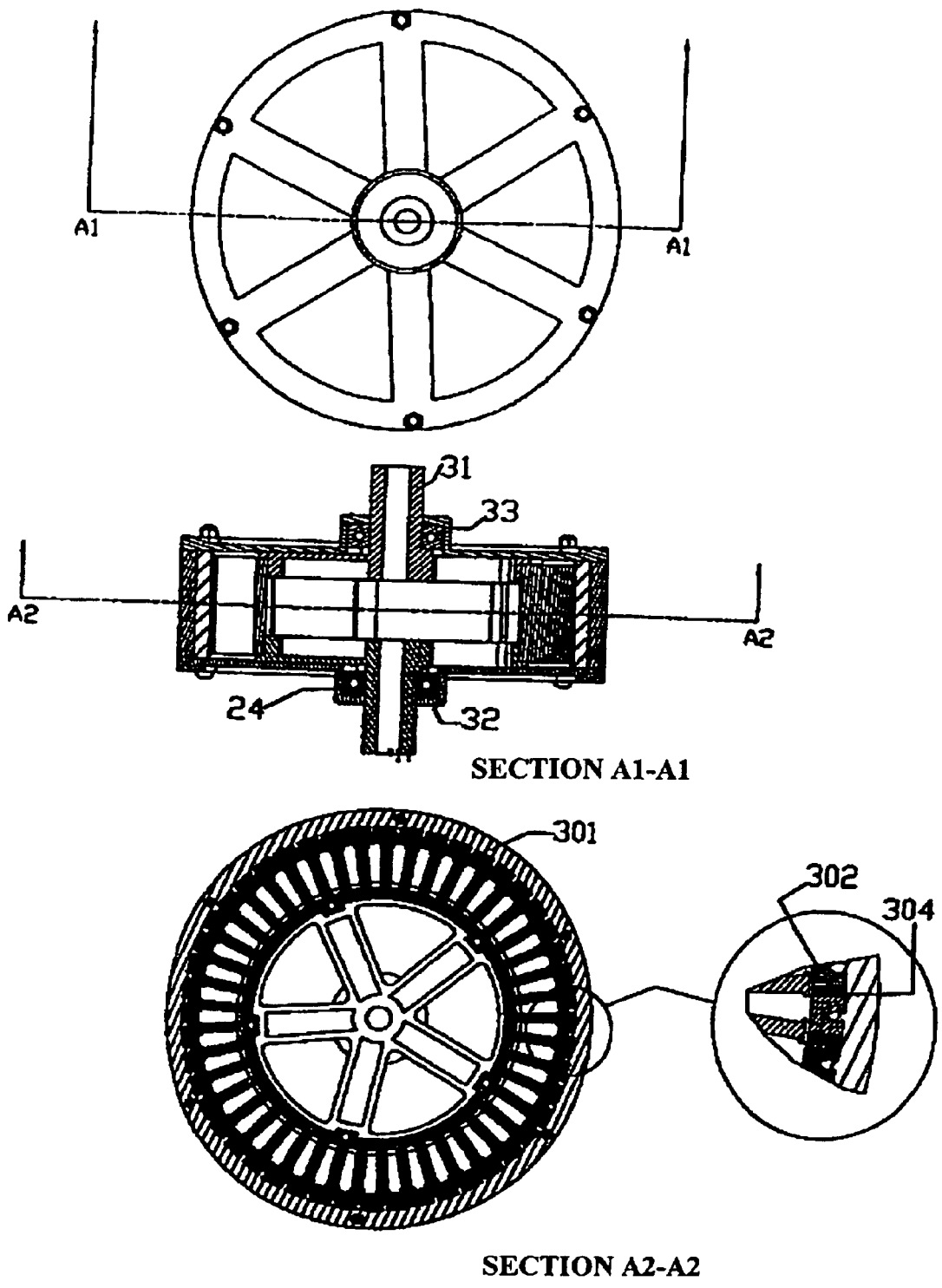
FIG. 10b is a cross-sectional view of the outer rotor/inner stator brushless DC motor structure.
Figure 11:
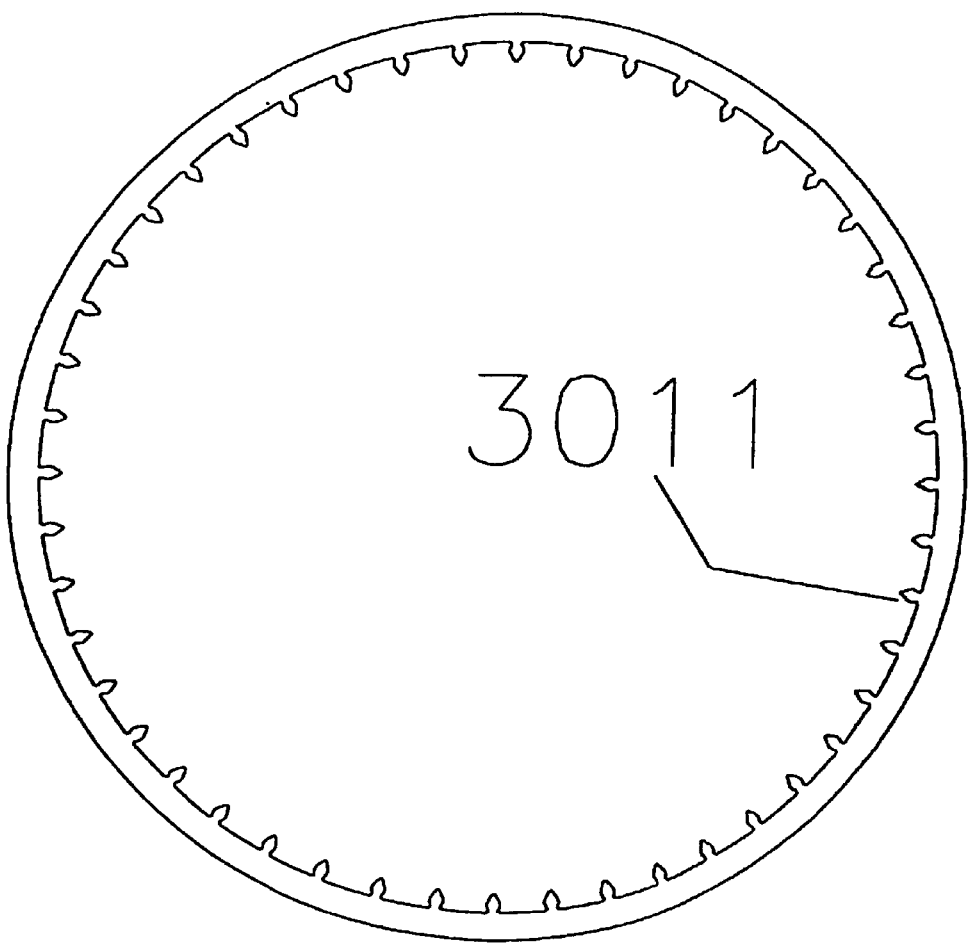
FIG. 11 is a cross-sectional view of the rotor main body of outer rotor/inner stator brushless DC motor structure of the invention.

Now, please refer to FIG. 9 and FIG. 10b. When the assembling type rotor structure of the motor 3 of invention is applied in inner stator/outer rotor brushless DC motor 3, the motor 3 includes a rotor 30, a stator 31, a front cap 32, a rear cap 33, a screw 34, and a nut 35. As shown in FIG. 10a and FIG. 10b, the rotor 30 includes a rotor's main body 301, a plurality of embedded type small teeth 302, and a plurality of permanent magnets 304. As shown in FIG. 11, the rotor's main body 301 also has a plurality of ribs 3011 made of non-permeable material such as aluminum alloy, plastic, and stainless steel.

Figure 12:
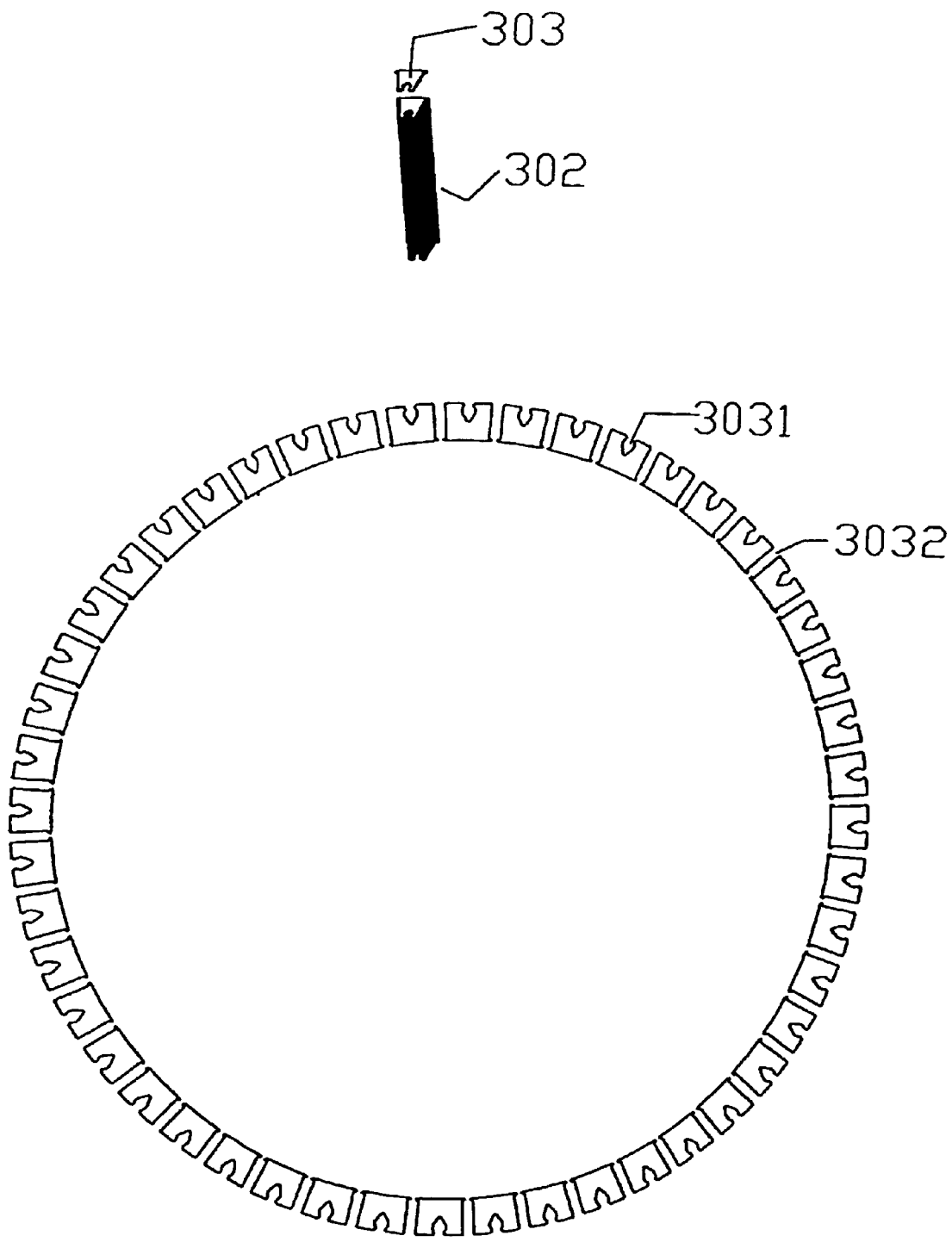
FIG. 12 is a cross-sectional view of the embedded type small teeth of outer rotor/inner stator brushless DC motor structure of the invention.

As shown in FIG. 12, a plurality of embedded type small teeth 302 that can be disassembled in axial direction are formed by punching and stacking up a plurality of permeable silicon steel sheets 303. Since each of the small teeth has a scoop channel 3031 having configuration and size matching those of ribs 3011 (refer to FIG. 11) of the rotor's main body, the small teeth can be embedded and tightly fitted into the rotor's main body. In this way, each small tooth 302 cannot be moved in tangential nor in radial direction in the plane perpendicular to the axis, providing rather firm fixation. Moreover, each pair of the adjacent embedded type small teeth forms a permanent magnet containing slot 3032 (refer to FIG. 12) that allows the permanent magnets 304 (refer to FIG. 10a and FIG. 10b) to be embedded and fixed in the containing slot 3032 (FIG. 12).

Because of the embedded design, the permanent magnet does not have to match the size of the motor's rotor as the conventional brushless DC motor does. This allows the permanent magnet to be made in rectangular sheet structure and, therefore, greatly reduces the manufacturing cost in producing the permanent magnet.

As shown again in FIG. 12, as the embedded type small teeth 302 are formed by punching and stacking up a plurality of permeable silicon steel sheets 303 and since the rotor can be disassembled into a plurality of unit tooth and embedded in the rotor's main body, the cost of the total manufacturing process is less than that of conventional manufacturing process. It can save a lot in mold making and material when applied in larger motors.

Figure 13:
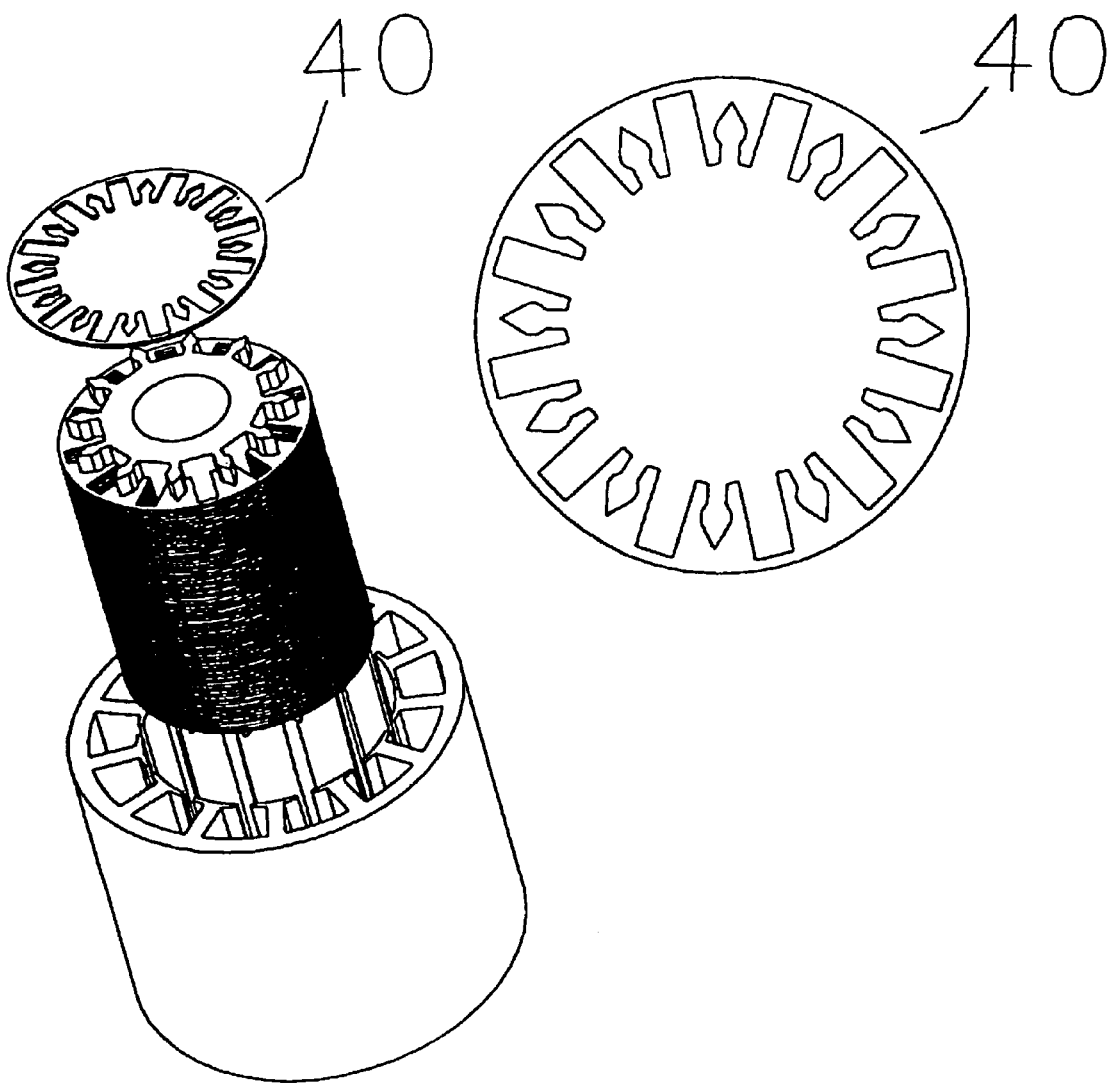
FIG. 13 is a cross-sectional view and a exploded view of the assembling type rotor structure fitting the embedded type small teeth in axial direction to form a annular silicon steel sheets for the application in the smaller outer-diameter brushless DC motor of the invention.

As shown in FIG. 13, when the assembling type rotor structure of the invention is applied in smaller outer diameter brushless DC motor, the small teeth of axially embedded type can be joined to form an annular silicon steel sheet 40. In this way, it can simplify assembling procedure to and shortening the assembling time of the silicon steel sheet.

The main body of the rotor structure of the invention is made of non-permeable material such as aluminum alloy, plastic, or stainless steel. Aluminum alloy helps a lot in reducing the motor's weight and manufacturing cost. In addition, one of the assembling type rotor structure's features is its embedded design of the permanent magnet. The fact that the permanent magnet does not have to match the size of the rotor's external surface greatly increases the flexibility of the design. Moreover, due to the embedded design of the permanent magnets, the assembling process is very simple and convenient while providing rather firm fixation. Therefore, it eliminates the disadvantage of requiring additional jig and fixture for positioning in order to attach the permanent magnet to the rotor as in the case of conventional brushless DC motor. In addition, when using permanent magnets made of material of rare earth metals and by sintering process, the invention allows the use of permanent magnet to be in rectangular sheet structure. Therefore, the invention greatly decreases the manufacturing cost for producing the permanent magnets.

Another feature of the rotor structure of the invention is its small teeth of axially embedded type, which is made by punching and stacking up a plurality of permeable silicon steel sheets. Because the rotor can be disassembled into a plurality of unit tooth and then embedded in the rotor's main body, the total manufacturing process cost is less than that of conventional manufacturing process. It can save a lot of expenditure in mold making and the use of material.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An assembling type rotor structure of a brushless DC motor comprising:

a rotor's main body having a plurality of ribs made of non-permeable material;

a plurality of embedded type small teeth formed by punching and stacking up a plurality of silicon steel sheets made of permeable material, each of the small teeth has a scoop channel having configuration and size matching those of the ribs of the rotor's main body such that the small teeth can be embedded and tightly fitted into the rotor's main body in axial direction, but can not be moved in tangential nor in radial direction on the plane perpendicular to the axis;

a plurality of containing slots formed between each pair of the adjacent embedded type small teeth to allow the embedded design of permanent magnets to be embedded, fixed, and contained therein; and two sealing caps to be locked and fixed at both the front and the rear ends of the rotor's main body to hold the permanent magnet and the embedded type small teeth in place.

2. The assembling type rotor structure of brushless DC motor in claim 1 that is applicable in outer stator/inner rotor brushless DC motor.

3. The assembling type rotor structure of brushless DC motor in claim 1 that is applicable in inner stator/outer rotor brushless DC motor.

4. The assembling type rotor structure of brushless DC motor in claim 1 wherein the rotor's main body is made of a kind of non-permeable material selected from the group consisting of aluminum alloy, plastic, and stainless steel.

5. The assembling type rotor structure of brushless DC motor in claim 1, wherein when the assembling type rotor structure is applied in the motor of smaller outer diameter, its embedded type small teeth of can be combined to form annular shape of silicon steel sheets to simplify the manufacturing process.

\* \* \* \* \*